United States Patent
Taniguchi et al.

(10) Patent No.: US 6,344,840 B1
(45) Date of Patent: Feb. 5, 2002

(54) PLASMA-ADDRESSED LIQUID CRYSTAL DISPLAY DEVICE

(75) Inventors: Osamu Taniguchi, Chigasaki; Akira Tsuboyama, Sagamihara, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/228,404

(22) Filed: Jan. 12, 1999

(30) Foreign Application Priority Data

Jan. 13, 1998 (JP) .......................... 10-005162
Oct. 20, 1998 (JP) .......................... 10-297475

(51) Int. Cl.$^7$ .................................................. G09G 3/28
(52) U.S. Cl. .................................. 345/60; 345/87
(58) Field of Search .................................. 345/60, 87

(56) References Cited

U.S. PATENT DOCUMENTS

| | | | |
|---|---|---|---|
| 5,347,381 A | 9/1994 | Shinomiya et al. | 359/78 |
| 5,420,602 A * | 5/1995 | Kanazawa | 345/67 |
| 5,440,201 A * | 8/1995 | Martin et al. | 313/582 |
| 5,523,770 A * | 6/1996 | Tanamachi | 345/60 |
| 5,612,802 A | 3/1997 | Okada et al. | 349/129 |
| 5,615,027 A | 3/1997 | Kuribayashi et al. | 345/87 |
| 5,661,501 A * | 8/1997 | Tanamachi | 345/60 |
| 5,661,532 A | 8/1997 | Okada et al. | 349/135 |
| 5,684,613 A | 11/1997 | Taniguchi et al. | 359/81 |
| 5,746,939 A | 5/1998 | Taniguchi et al. | 252/299.01 |
| 5,790,223 A | 8/1998 | Hanyu et al. | 349/184 |
| 5,805,122 A * | 9/1998 | Bongaerets et al. | 345/60 |
| 5,805,129 A | 9/1998 | Inaba et al. | 345/97 |
| 5,835,248 A | 11/1998 | Hanyu et al. | 359/76 |
| 5,990,619 A * | 11/1999 | Heisin et al. | 313/584 |
| 6,061,042 A * | 5/2000 | Takahashi et al. | 345/87 |
| 6,094,183 A * | 7/2000 | Tahamachi et al. | 345/60 |
| 6,122,022 A * | 9/2000 | Hayakawa | 349/32 |
| 6,130,655 A * | 10/2000 | Lammers | 345/72 |

FOREIGN PATENT DOCUMENTS

| | | |
|---|---|---|
| JP | 1-217396 | 8/1989 |
| JP | 5-072159 | 3/1993 |
| JP | 10-177145 | 6/1998 |
| JP | 10-177146 | 6/1998 |

* cited by examiner

Primary Examiner—Bipin Shalwala
Assistant Examiner—Vincent E. Kovalick
(74) Attorney, Agent, or Firm—Fitzpatrick, Cella, Harper & Scinto

(57) ABSTRACT

A plasma-addressed liquid crystal display device capable of high-speed drive and improved viewing characteristic is composed of a liquid crystal cell structure and plasma cell structure stacked with each other. The liquid crystal cell structure is formed by sandwiching a liquid crystal having a spontaneous polarization between a first transparent substrate having therein transparent electrode stripes and an alignment film covering the electrode stripes, and a dielectric sheet having thereon an alignment film. The plasma cell structure is formed of a second transparent substrate having thereon cathode stripes and anode stripes disposed alternately with a spacing therebetween, stacked via stripe-shaped partitions disposed along the anode stripes onto the dielectric sheet so as to form plasma channels between the partitions filled with an ionizable gas sealed up therein.

4 Claims, 9 Drawing Sheets

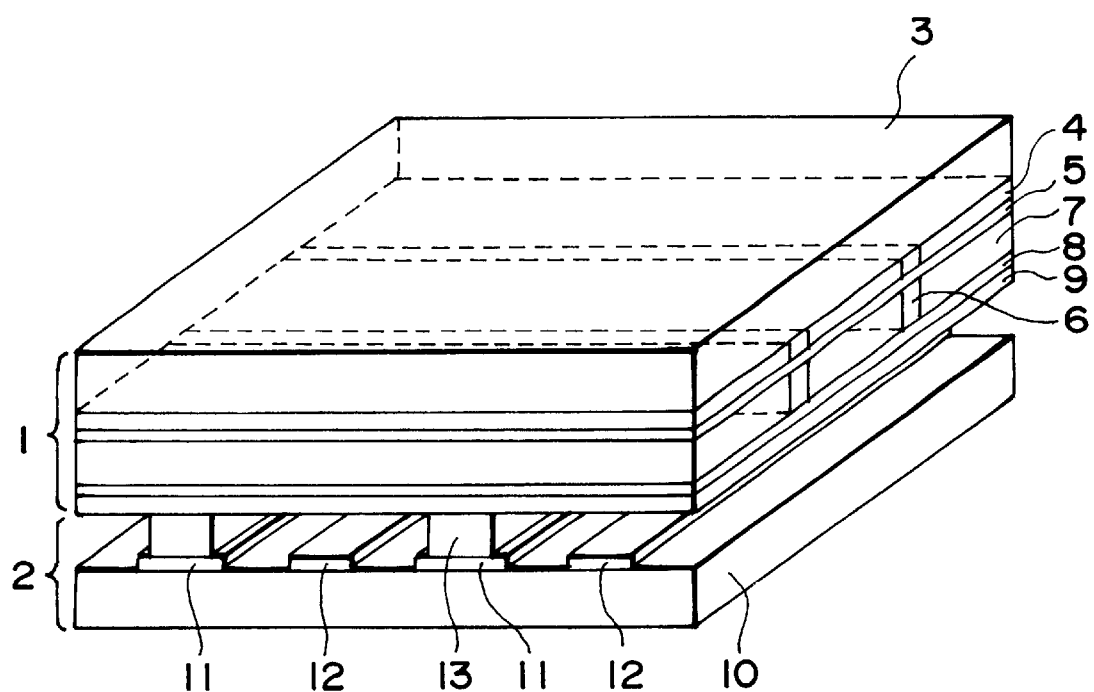
F I G. 1

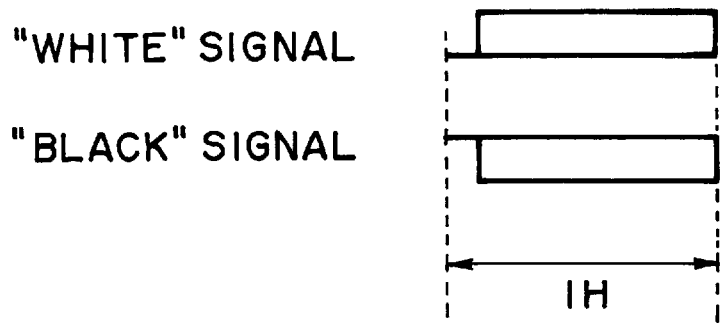
F I G. 9
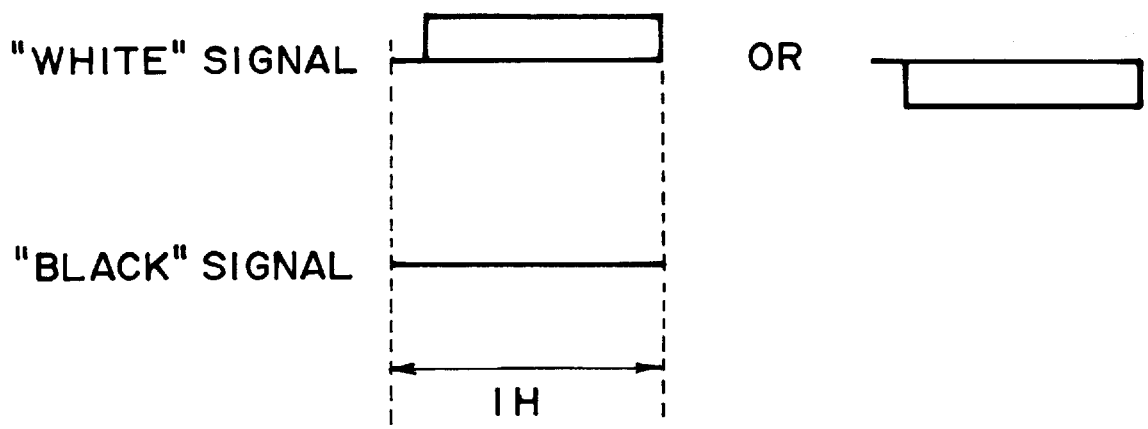
F I G. 10

PLASMA-ADDRESSED LIQUID CRYSTAL DISPLAY DEVICE

FIELD OF THE INVENTION AND RELATED ART

The present invention relates to a plasma address-type liquid crystal display device.

Hitherto, as a matrix-type liquid crystal display device for providing a high resolution and a high contrast, it has been a general practice to provide an active matrix-type device wherein each pixel is provided with a switching device, such as a thin film transistor (TFT). This type of device is however accompanied with a problem that the increase in display area results in a lower production yield and thus an increased production cost.

On the other hand, as a solution to such a cost problem accompanying the active matrix-type device, there has been proposed a plasma address-type liquid crystal display device wherein addressing is performed by selective plasma discharge instead of TFTs, e.g., by Japanese Laid-Open Patent Application (JP-A) 1-217396 and JP-A 5-72159.

However, the plasma-addressed liquid crystal display device is accompanied with problems, such as a slow response speed and a poor viewing angle characteristic, owing to the use of a nematic liquid crystal.

Further, a conventional plasma-addressed liquid crystal display device is accompanied with a problem that respective plasma chambers are provided with different performances, such as a difference in plasma life $\tau p$, i.e., a period from the generation to extinction of plasma, due to a fluctuation in production conditions for the respective plasma chambers or channels.

As a result, when a liquid crystal pixel is supplied with a data signal having a pulse width designed to terminate simultaneously with the termination of plasma life $\tau p$, certain pixels are liable to fail in writing with desired picture data due to an insufficient charge storage by the data signal caused by the fluctuation in plasma life $\tau p$ at certain plasma chambers. More specifically, certain plasma chambers can be provided with longer plasma life $\tau p$, before the termination of which a data a signal pulse is terminated, due to a production error, thus causing a charge leakage from the liquid crystal layer.

SUMMARY OF THE INVENTION

In view of the above-mentioned problems, an object of the present invention is to provide a plasma-addressed liquid crystal display device having a fast response speed and an excellent viewing angle characteristic.

Another object of the present invention is to provide a plasma-addressed liquid crystal display device excellent in display characteristics, such as gradational display characteristics and viewing angle characteristic and also in impact resistance.

Another object of the present invention is to provide a plasma-addressed liquid crystal display device capable of writing desired picture data in pixels regardless of a fluctuation in plasma life $\tau p$ for respective plasma chambers due to a possible production error.

According to the present invention, there is provided a plasma-addressed liquid crystal display device, comprising: a liquid crystal cell structure including a layer of liquid crystal and a plasma cell structure, in a stacked configuration, wherein the liquid crystal is a liquid crystal having a spontaneous polarization.

According to another aspect of the present invention, there is provided a plasma-addressed liquid crystal display apparatus comprising: a liquid crystal device including a liquid crystal cell structure and a plasma cell structure in a stacked configuration; wherein the liquid crystal cell structure comprises a first transparent substrate having thereon transparent electrode stripes and an alignment film, a dielectric sheet having thereon an alignment film disposed opposite to the alignment film on the first transparent substrate, and a liquid crystal disposed between the alignment films, and the plasma cell structure comprises a second transparent substrate having thereon pluralities of cathode stripes and anode stripes disposed alternately with a prescribed spacing therebetween, and stripes of partitions formed along the anode stripes; the plasma cell structure being stacked onto the dielectric sheet of the liquid crystal cell structure via the partitions so as to form plasma chambers filled with an ionizable gas between the partitions and so that the cathode stripes and anode stripes intersect the transparent electrode stripes;

the display apparatus further comprising:

data signal application means for applying data signals to the transparent electrode stripes, anode potential application means for applying an anode potential to the anode stripes, and cathode potential application means for applying a cathode potential capable of generating plasma in an associated plasma channel to the cathode stripes, wherein the data signal application means applies a data signal having a pulse width which terminates after termination of average plasma life in the plasma channels in one horizontal scanning period.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 1 is a partial perspective illustration of an embodiment of the liquid crystal device according to the invention.

FIG. 9 illustrates an example set of data voltages applied in a liquid crystal device according to the invention.

FIG. 10 illustrates another example set of data voltages applied in a liquid crystal device according to the invention.

DESCRIPTION OF THE PREFERRED EMBODIMENTS

Figure 2A:
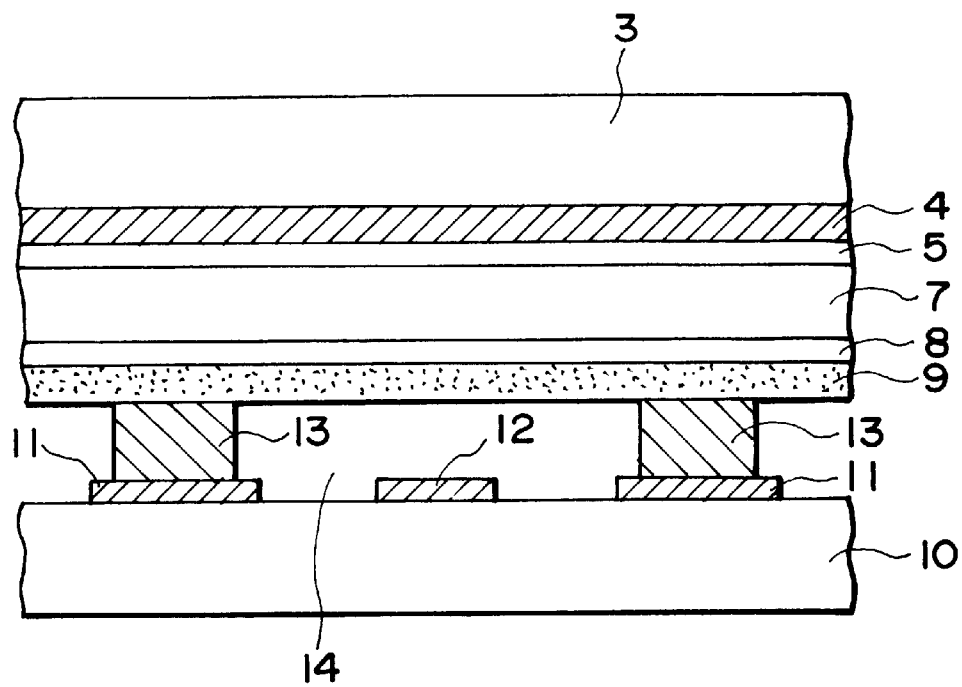
FIGS. 2A and 2B are schematic sectional views of the liquid crystal device shown in FIG. 1.

A preferred class of liquid crystals used in the present invention may include a chiral smectic liquid crystal having a voltage-transmittance characteristic having no memory characteristic, particularly a threshold-less anti-ferroelectric liquid crystal (hereinafter sometimes referred to as "TLAFLC") showing monostability. As described in the following references (1)–(3), TLAFLC shows a behavior that its optical average molecular axis direction changes along a substrate plane continuously in response to a change in applied voltage, thus losing a hysteresis shown by a conventional anti-ferroelectric liquid crystal (AFLC). Accordingly, TLAFLC is expected to be applied to display devices capable of displaying multi-level gradations at a wide viewing angle by a combination with an active device, such as TFT.

(1) T. Yoshida, et al.; "A full-color thresholdless Antiferroelectric LCD exhibiting side viewing angle with fast response time", SID 97 (Society for Information Display 97) DIGEST, p. 841.

(2) T. Saishu, et al.; "Voltage-holding properties of thresholdless antiferroelectric liquid crystals driven by active matrices", SID 96 (Society for Information Display 96) DIGEST, p. 703.

(3) Miyaji, et al.; "Mechanism of Development of Antiferroelectric phase in Liquid Crystal and Possibility of Thresholdless Antiferroelectric Phase (in Japanese)", Applied Physics, Vol. 65, No. 10 (1996), p. 1029.

However, the drive of a liquid crystal having a spontaneous polarization, such as TLAFLC, with TFT, is accompanied with a problem that each TFT is required to show a large current suppliability or a supplemental capacity is required, because of an inversion current due to the spontaneous polarization at the time of switching. These requirements become severer as the liquid crystal used has a larger spontaneous polarization, like TLAFLC.

Further, a chiral smectic liquid crystal generally has a smectic layer structure, so that it is vulnerable to a deformation of or an impact to a liquid crystal cell. This holds true with TLAFLC. Further, as a general measure for providing a liquid crystal display with an improved contrast, it has been practiced to form a black matrix of metal, etc., for masking spacings between pixels. This is another factor for increasing production steps and thus production cost.

The present invention also aims at solving these problems accompanying the use of a smectic liquid crystal.

More specifically, the liquid crystal device of the present invention is of the plasma address type, and therefore does not involve a restriction of supply current like TFT, thus being fully capable of driving a liquid crystal having a large spontaneous polarization, such as TLAFLC.

Further, if stripe spacers are disposed in a liquid crystal cell to ensure a liquid crystal layer thickness (cell gap) and the spacers are provided with adhesiveness, a liquid crystal cell substrate (a first transparent substrate) and a dielectric sheet may be bonded to each other to provide a remarkably improved durability against impact and strain.

Further, if the spacers in the liquid crystal cell are disposed at spacings between the transparent electrodes so as to form a black matrix having an optical masking function in combination with partitioning walls for plasma chambers disposed to intersect the spacers, a metal-made black matrix need not be formed separately.

In the present invention, the liquid crystal used may preferably be TLAFLC as mentioned above and may also preferably comprise a DHF (deformed helix ferroelectric)-mode liquid crystal having a helical pitch shorter than a cell gap in chiral smectic C phase (SmC*).

Figure 2B:
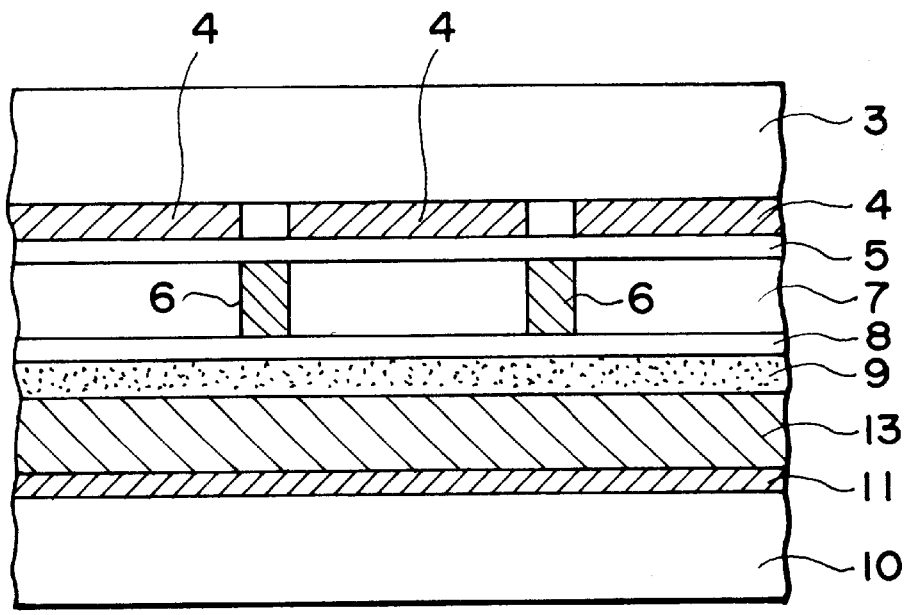

FIG. 1 is a partial perspective view schematically showing an embodiment of the liquid crystal device according to the present invention, FIG. 2A is a schematic sectional view thereof and FIG. 2B is another sectional view thereof showing a section perpendicular to that shown in FIG. 2B.

Referring to these figures, the liquid crystal device includes a liquid crystal cell (structure) 1 and a plasma cell (structure) 2. The liquid crystal cell 1 includes a smectic liquid crystal 7 disposed between a first transparent substrate 3 and a dielectric sheet 9, and alignment films 5 and 8 are disposed respectively at boundaries with the liquid crystal 7. Further, stripe-shaped transparent electrodes 4 are disposed on the first transparent substrate 3 with a spacing from each other, and along the spacings, stripe-shaped spacers 6 are disposed so as to ensure the thickness of the liquid crystal layer 7. The spacers 6 may have a width equal to the spacings between the transparent electrodes 4 but can also have a broader or a narrower width within an extent of not adversely affecting the display quality.

On the other hand, the plasma cell (structure) 2 includes stripe-shaped anodes 11 and stripe-shaped cathodes 12 which are alternately disposed with a prescribed spacing therebetween on a second transparent substrate 10 so that the anodes 11 and cathodes 12 are disposed inside to face the dielectric sheet 9 and so as to intersect the transparent electrodes 4 of the liquid crystal cell 1 at right angles. The second transparent substrate 10 and the dielectric sheet 9 are disposed with a gap therebetween, which is preferably retained by stripe-shaped partitions 13 formed on the anodes 11. The partitions 13 intersect the spacers 6 in the liquid crystal cell 1 at right angles, and a combination of these provides a masking member for masking spacings between the pixels of the liquid crystal cell 1, principally because of their isotropy when combined with a pair of cross nicol polarizers (not shown) disposed above the substrate 3 and below the substrate 10, respectively, thus unnecessitating an additional black matrix structure.

The first transparent substrate 3 and the second transparent substrate 10 may preferably both comprise a glass substrate, but plastic substrates, etc., can also be used, if the required strength and transparency are satisfied. The transparent electrodes 5 may comprise a transparent conductor, such as ITO (indium tin oxide), and the anodes 11 and cathodes 12 may comprise a metal conductor. The alignment films 5 and 8 may comprise a material, such as polyimide, generally used for liquid crystal alignment, subjected to rubbing. The rubbing directions to the alignment films 5 and 8 may be generally parallel or anti-parallel (i.e., parallel in opposite direction), but may preferably cross each other so as to provide a crossing angle of ca. 5 deg., in order to provide a uniform alignment.

The spacers 6 may comprise a photoresist, photosensitive polyimide or polyvinyl alcohol, or may be formed simultaneously with the alignment film 5 and 8 by using a polyimide identical to the one constituting the alignment film 5 or 8. The partitions 13 may comprise a material consisting principally of glass, more specifically a glass paste comprising glass powder, a polymeric resin, a solvent and an optional filler. Such a glass paste may be repetitively applied, e.g., by screen printing and drying followed by final baking, to form the partitions 13. The dielectric sheet 9 may preferably as thin as possible for effective drive of the liquid crystal cell 1 and may for example comprise a thin glass sheet having a thickness on the order of 50 µm.

The plasma cell 2 may be provided with a hermetically sealed structure, e.g., with a frit seal (not shown) comprising a low-melting point glass, thereby forming plasma channels (or chambers) 14 between the partitions 13. The plasma channels may be filled with ionizable gas, such as helium, neon, argon or a mixture of there.

In the above-described structure, an insulating film of an organic material, such as $SiO_2$ or $TaO_x$, can be inserted between the alignment film 5 and the transparent electrodes 4, and/or between the dielectric sheet 9 and the alignment film 8. It is also possible to dispose a layer of color filter between the first transparent substrate 3 and the transparent electrodes 4, so as to allow a full-color display.

Based on the above structure, when a prescribed voltage is applied between an anode 11 and a cathode 12 corresponding to a prescribed plasma channel 14, the gas in the plasma channel 14 is selectively ionized to cause a plasma discharge, and the interior of the channel 14 is retained almost at the anode potential. In this state, when the transparent electrodes 4 are sequentially supplied with a data voltage, the data voltage (minus the anode potential) is applied across the liquid crystal layer 7 at pixels along the plasma channel 14 causing the plasma discharge and on the transparent electrodes 4 to write in the pixels. After termination of the plasma discharge, the plasma channel 14 is held at a floating potential, whereby the data written in the liquid crystal layer at the respective pixels is retained until a subsequent writing period. The written data is optically discriminated by a pair of polarizers (not shown) disposed outside the first transparent substrate 3 and the second transparent substrate 10.

Figure 3:
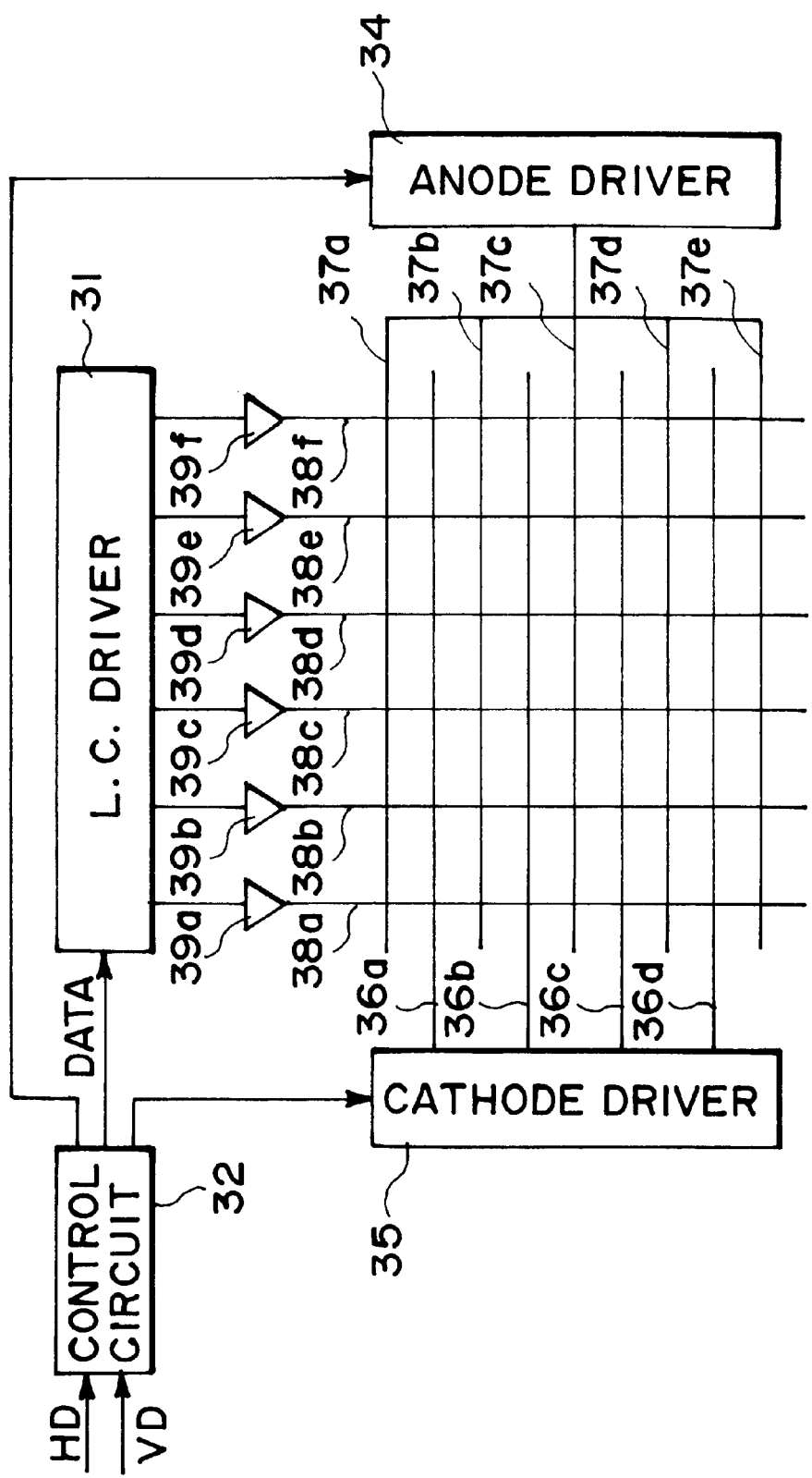
FIG. 3 is a circuit diagram for the liquid crystal device shown in FIG. 1.

FIG. 3 is a drive circuit diagram for a liquid crystal apparatus including the above-described liquid crystal device based on a model arrangement of 4×5 pixels. Referring to FIG. 3, the liquid crystal apparatus includes a liquid crystal driver 31, a control circuit 32, an anode driver 34, a cathode driver 35, cathodes 36a to 36d, anodes 37a to 37e, transparent electrodes 38a to 38f, and buffers 39a to 39f. Video data (DATA) is inputted to the liquid crystal driver 31, from which data voltages are simultaneously outputted for each horizontal scanning period (1H). The data voltages are supplied via the buffers 39a to 39f to the transparent electrodes 38a to 38f, respectively. The control circuit 32 is supplied with a horizontal synchronizing signal HD and a vertical synchronizing signal VD as synchronizing basis signals corresponding to the video data, and based thereon, controls the operations of the liquid crystal driver 31, anode driver 34 and cathode driver 35. The anodes 37a–37e are commonly connected to the anode driver 35 and are supplied therefrom with an anode voltage as a reference voltage. Further, the cathodes 36a–36d are sequentially supplied for each 1H period with a cathode voltage having a prescribed potential difference with the anode potential from the cathode driver 35, to be scanned sequentially row by row.

Figure 4:
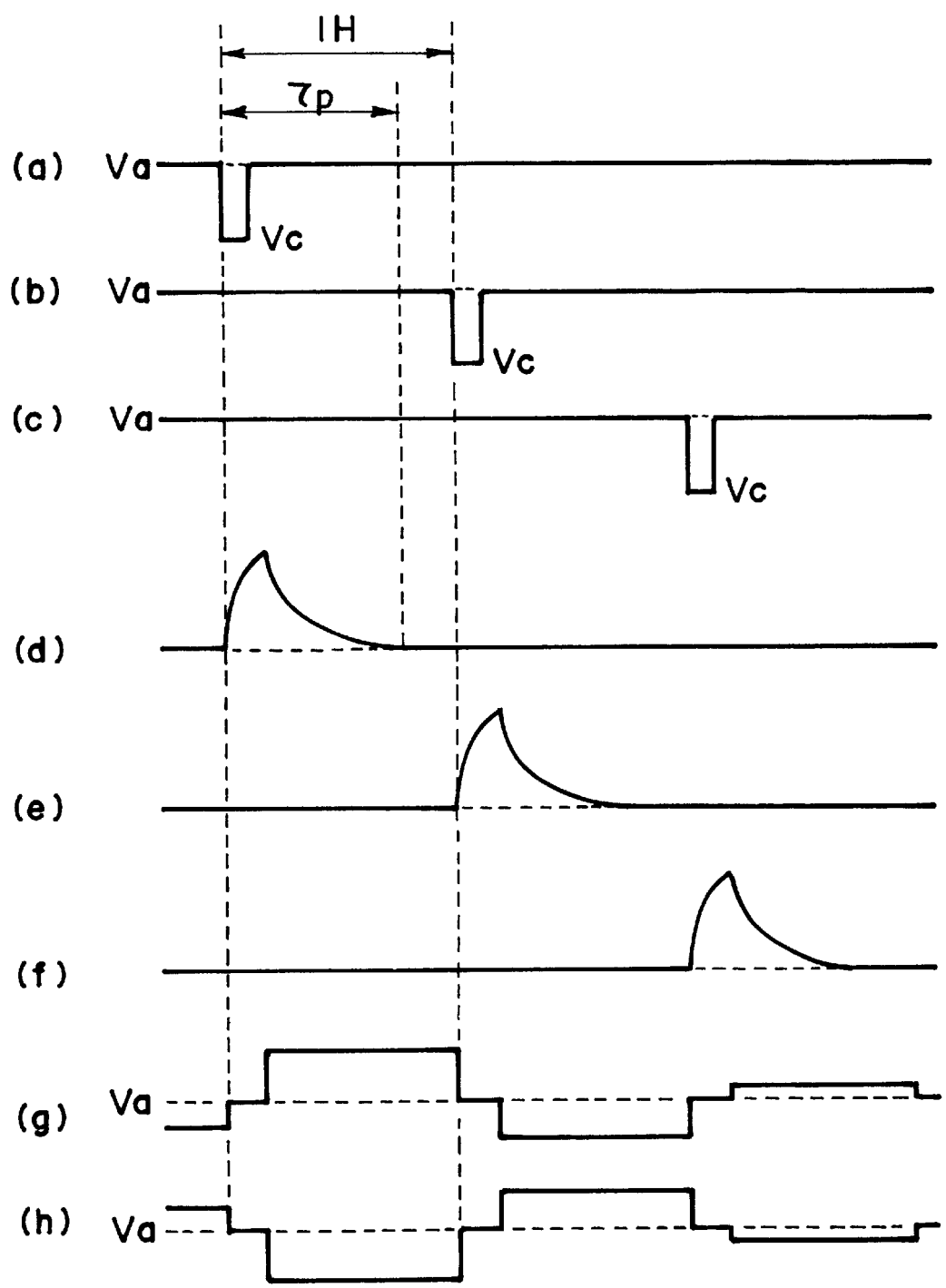
FIG. 4 is a time chart showing various waveforms including voltage waveforms applied to a cathode and a transparent electrode and a charge change in a plasma channel.

FIG. 4 is a time chart showing voltage waveforms applied to the cathode electrodes and changes in charges in plasma channels. More specifically, in FIG. 4, at (a)–(c) are shown voltage waveforms applied to successively disposed three cathodes 36; at (d)–(f) are shown changes of charges in plasma channels 14 in which the cathodes of (a)–(c) are disposed; and at (g) and (h) are shown voltage waveforms applied to a transparent electrode 38 in an n-th frame and an n+1-th frame, respectively. Further, in FIG. 4, Va denotes an anode potential; Vc, a cathode voltage pulse amplitude; 1H, a one horizontal scanning period; τp, a plasma life (i.e., a period from the generation to extinction of plasma).

In the present invention, a data voltage having an amplitude (pulse height) modulated corresponding to given picture data (gradation data) is applied to a transparent electrode 38 in synchronism with a voltage pulse (Vc) applied to a cathode 36. The polarity of the data voltage is inverted for each 1H or each frame, or for each 1H and each frame. The data voltage application period (pulse width) in 1H is set to be longer than the cathode voltage pulse (Vc) width and terminate after the termination of the plasma life τp (on an average for the respective plasma channels). As a result, the data voltages are retained at all the liquid crystal pixels to allow a desired picture display.

The materials and production methods of the liquid crystal device according to the present invention may be modified within an extent of not obstructing the effect of the present invention by adopting those used in conventional plasma-addressed liquid crystal devices using a nematic liquid crystal.

EXAMPLE 1

A liquid crystal device having a structure as generally described with reference to FIGS. 1, 2A and 2B was prepared in the following manner.

For preparing a plasma cell structure 2, a silver paste was applied by screen printing in a thickness of 30 µm on a 1.9 mm-thick glass substrate 10 and in a pattern including ca. 50 µm-wide cathode stripes 12 and ca. 100 µm-wide anode stripes 11 disposed alternately at a pitch of 0.64 mm. Then, a lead borosilicate-based glass paste was applied by screen printing and baked to form ca. 80 µm-wide and 200 µm-high partitions 13 on the anodes 11. Then, a 50 µm-thick dielectric sheet 9 of thin glass sheet was superposed on the thus-formed partitions 13 on the glass substrate 10 bonded thereto by frit sealing at the periphery while sealing up an inert gas within respectively ca. 200 µm-wide plasma channels to form a plasma cell structure 2.

Separately, a 1.1 mm-thick glass substrate 3 was coated with a ca. 100 nm-thick ITO film by sputtering, followed by patterning into 250 µm-wide transparent electrodes 4 with a spacing of 50 µm from each other. The transparent electrodes were further coated with a solution in an organic mixture solvent of a polymeric acid ("LP-64", mfd. by Toray K.K.) as a polyimide precursor by spin coating, followed by 1 hour of baking at ca. 200° C., to form a polyimide film 5. Similarly, the dielectric sheet 9 constituting plasma cell structure 2 was coated with a polyimide film 8.

Then, the glass substrate 3 coated with the polyimide film was further coated with a photoresist solution by spin coating, followed by pre-baking at ca. 90° C., pattern exposure, development and ca. 1 hour of post-baking at ca. 140° C. to form ca. 1.5 µm-high and 50 µm-wide spacers 6 at the spacings between the transparent electrodes 4. The thus-treated glass substrate 3 and the dielectric sheet 9 were respectively rubbed in one direction on their polyimide films. Then, the glass substrate 3 was superposed on the dielectric sheet 9 so that their rubbed polyimide films faced each other, their rubbing directions crossed at an angle of ca. 5 deg. and the transparent electrodes 4 crossed and anode stripes 11 and cathode stripes in the plasma cell structure 2 at right angles, and were applied to each other with a sealing agent applied at the periphery of the substrates, followed by heating under pressure for bonding between the substrates and providing adhesiveness to the spacers 6, to form a blank cell structure (1).

Finally, an anti-ferroelectric crystal having a spontaneous polarization Ps of 150 nC/cm$^2$ (at 30° C.), a tilt angle ⒽⒽ at 30 deg. (at 30° C.) and a dielectric constant ε of 5 (at 30° C.), was injected into the blank cell (1) to form a liquid crystal cell 1 showing a voltage-transmittance characteristic shown in FIG. 5 when sandwiched between a pair of cross nicol polarizers and having 320×240 pixels.

The thus-formed plasma-addressed liquid crystal device was driven by using a set of drive waveforms as shown in FIG. 4 wherein a plasma discharge voltage (Vc−Va) was set to −350 volts, a data voltage ranged +6 volts −6 volts and 1H was set to 70 μsec. As a result, a good picture display could be performed at a maximum contrast of ca. 80.

Figure 5:
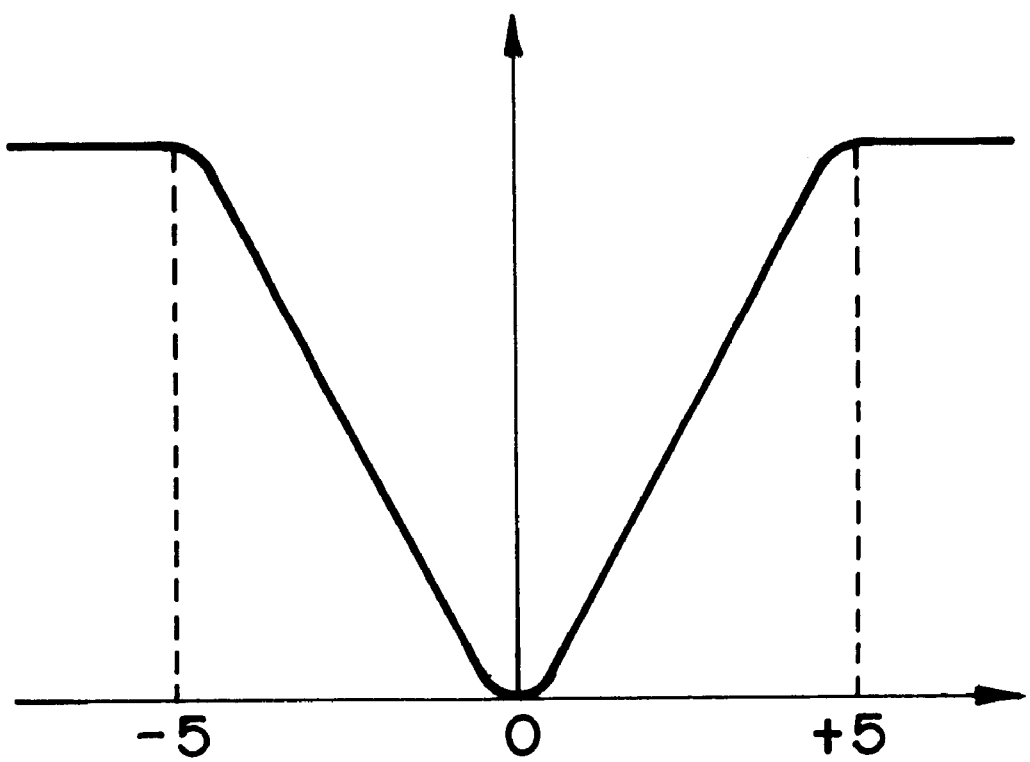
FIG. 5 shows a voltage-transmittance curve for a liquid crystal used in an Example.
Figure 11A:
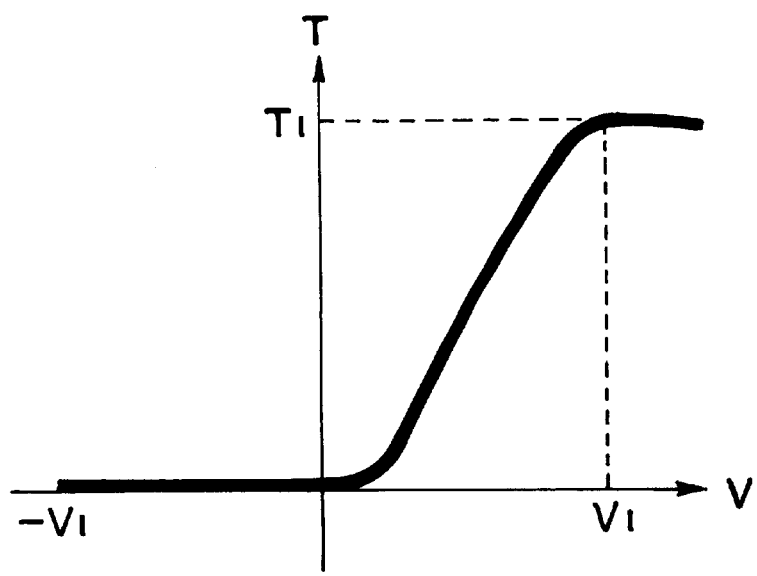
FIGS. 11A and 11B respectively show a voltage-transmittance curve of a liquid crystal used in an Example.
Figure 11B:
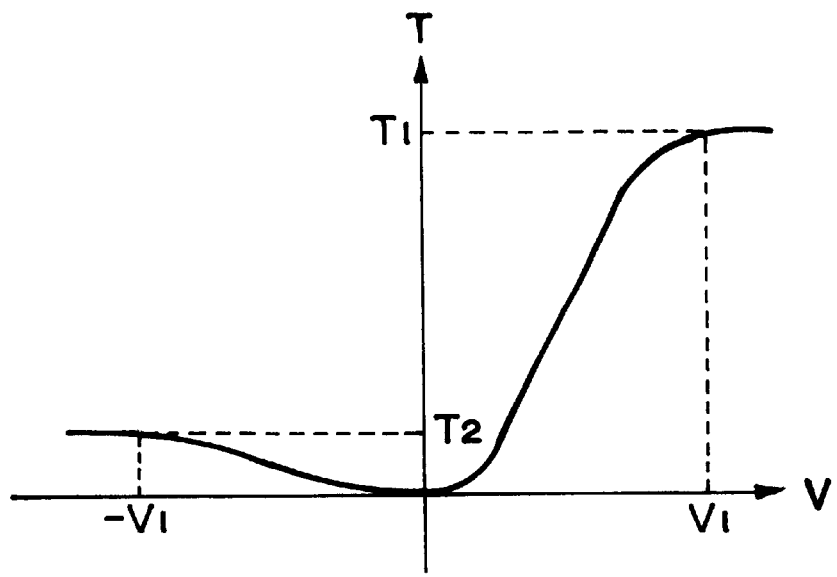

Incidentally, in the present invention, it is also possible to use a liquid crystal showing a voltage-transmittance (V-T) characteristic as shown in FIG. 11A or FIG. 11B instead of an AFLC showing a V-T characteristic as shown in FIG. 5 and used in Example 1 above.

The liquid crystal having a V-T characteristic of FIG. 11A is a chiral smectic liquid crystal showing monostability represented by a transmittance T1 at a positive voltage V1, a transmittance of zero at a negative voltage (e.g., −V1) and a continuously changing transmittance in a voltage range of 0 to V1 (as disclosed in Japanese Patent Application No. 177146/1998).

The liquid crystal having a V-T characteristic of FIG. 11B is a chiral smectic liquid crystal showing monostability represented by a transmittance T1 at a positive voltage V1, a non-zero transmittance T2 at a negative voltage −V and a continuously changing transmittance in a voltage range of 0 to V1 (as disclosed in Japanese Patent Application No. 177145/1998).

As described above, according to the present invention, it is possible to provide a liquid crystal display device allowing a high-speed display and a picture display with excellent contrast and viewing angle characteristic as well as a good impact resistance.

(Second Embodiment)

Figure 6:
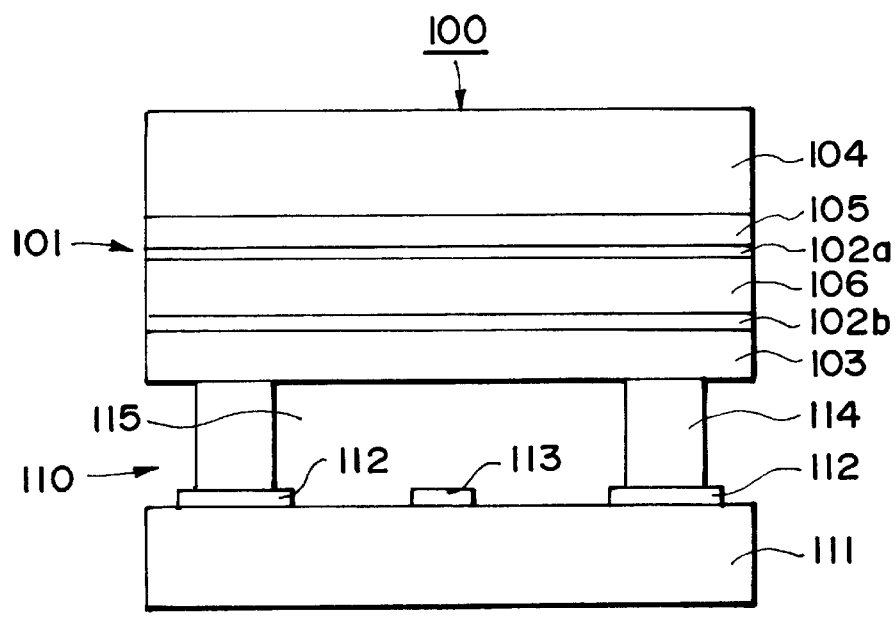
FIGS. 6 and 7 are a schematic sectional view and a schematic perspective view of another embodiment of the liquid crystal device according to the invention.
Figure 7:
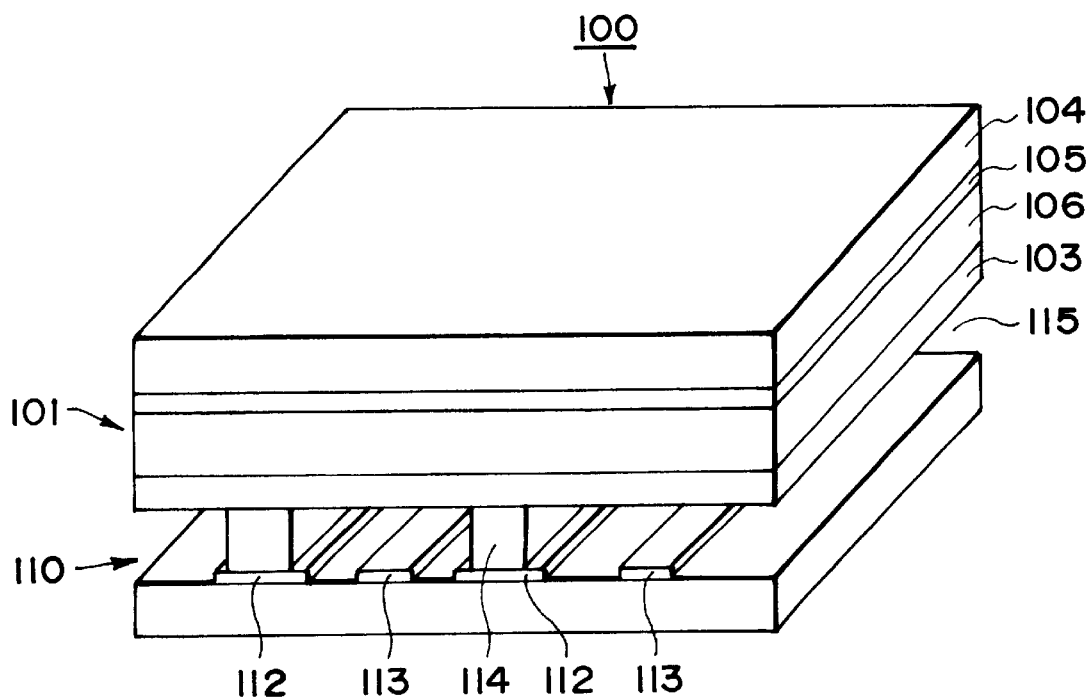

FIGS. 6 and 7 are a schematic sectional view and a schematic perspective view, respectively, of a liquid crystal display device according to this embodiment.

Referring to these figures, a liquid crystal display device 100 includes a liquid crystal cell (structure) 101, a plasma cell (structure) 110, and a dielectric sheet 103 disposed therebetween, in a laminated state.

For effective drive of the liquid crystal cell 101, the dielectric sheet 103 may preferably be as thin as possible and may for example comprise a ca. 50 μm-thick thin glass sheet.

The liquid crystal cell 101 may include a 1.1 mm-thick glass sheet (upper substrate) 104. The inner surface of the upper substrate 104 is provided with transparent electrode stripes 105 of ITO extending in a row direction. The upper substrate 104 is bonded to the dielectric sheet 103 via spacer beads (not shown) of ca. 1 μm in diameter, so as to form a cell gap therebetween which is filled with a bistable ferroelectric liquid crystal (hereinafter denoted by "FLC") 106. FLC 106 may for example comprise a pyrimidine-based liquid crystal mixture having the following characteristics:

Phase transition series:

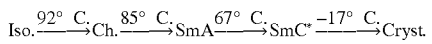

Spontaneous polarization Ps=6 nC/cm$^2$ (30° C.)
Tilt angle ⒽⒽ=15 deg. (30° C.)
Dielectric anisotropy Δε=−0.2 (30° C.)

On the other hand, the plasma cell 110 may include a 1.9 mm-thick glass substrate (lower substrate) 111. On the inner surface of the lower substrate 111, pluralities of stripe-shaped anodes 112 and cathodes 113 are arranged in parallel with each other and alternately with a prescribed spacing therebetween so as to extend in a column direction.

At an almost central portion along the anode stripes 112, partitions 114 are formed respectively in a prescribed width. The partitions 114 may be formed of a material consisting principally of glass and disposed in stripes along the anode stripes 112, e.g., from a glass paste formed by screen printing. The partitions 114 are abutted against the dielectric sheet 103, and the periphery of the substrate 111 is sealed by frit sealing with a low-melting point glass, thereby forming plasma channels 114 each in a width of ca. 200 μm and filled with an ionizable gas, such as helium, neon, argon or a mixture of these.

The thus-constituted picture display device may be driven in the following manner.

When a prescribed voltage is applied between anodes 112 and a cathode 113 corresponding to a prescribed plasma channel 15, the gas in the plasma channel 115 is selectively ionized to cause plasma discharge, so that the interior of the plasma channel 115 is held nearly at the anode potential. When the transparent electrodes 105 are sequentially supplied with a data voltage in this state, the FLC layer at pixels on the transparent electrodes and along the plasma channel 115 where the plasma discharge occurs is selectively supplied with the data voltage across the dielectric sheet 103.

After completion of the plasma discharge, the plasma channel 115 is held at a floating potential, the data written in the FLC layer at the respective pixels is retained until the subsequent writing period.

The written data is discriminated by a pair of polarizers (not shown) disposed outside the liquid crystal display device 100.

In addition to the above-mentioned surface-stabilized FLC (SSFLC)-mode, it is also possible to use a DHF-mode FLC having a helical pitch smaller than a cell gap, thus not showing a memory characteristic, in the present invention.

FIG. 3 shows a circuit arrangement for the above-mentioned liquid crystal display device 100.

As shown in FIG. 3, a liquid crystal driver 31 is supplied with video data (DATA) so as to simultaneously output data voltages DSa–DSf at each horizontal scanning period (1H). The data voltages DSa–DSf are supplied via respective buffers 39a–39f to respective data electrodes (row electrodes) 105 (38a–38f).

A control circuit 203 is supplied with a horizontal synchronizing signal HD and a vertical synchronizing signal VD as synchronizing basis signals corresponding to the video data, and based thereon, controls the operations of the liquid crystal driver, an anode driver 34 and a cathode driver 35. Anodes 37a–37e commonly connected to the anode driver 34 are supplied with an anode voltage VA as a reference voltage. On the other hand, cathodes 36a–36d are sequentially supplied with cathode voltages VCa–VCd having a prescribed potential difference from the anode voltage VA.

Figure 8:
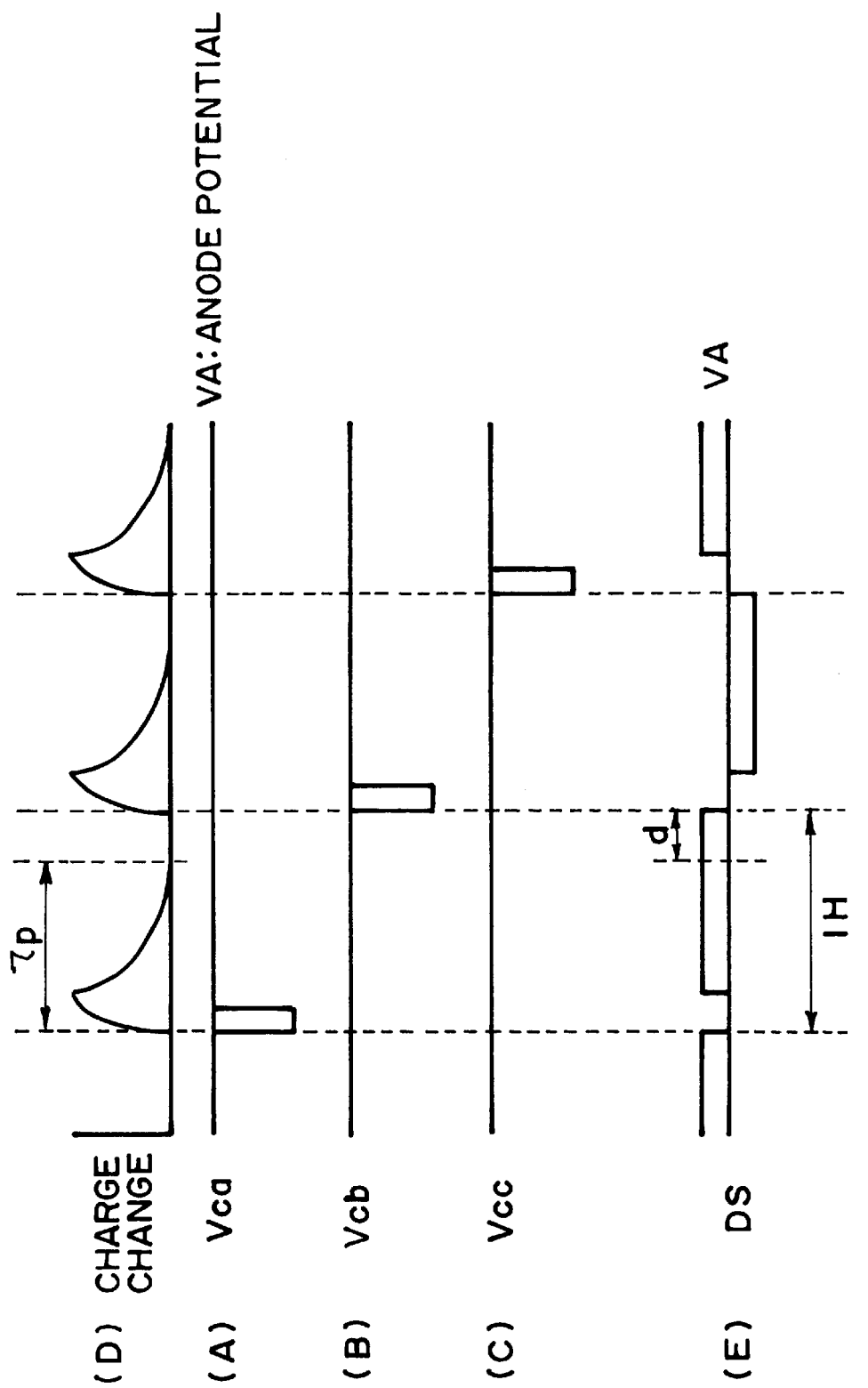
FIG. 8 is a time chart for illustrating various waveforms for driving the liquid crystal device of FIGS. 6 and 7, including (A)–(C) showing voltage waveforms applied to successive cathodes, (D) showing a charge change in a plasma channel, and (E) showing a data voltage applied to a transparent electrode.

FIG. 8 shows a set of drive waveforms supplied from the control circuit 203 for driving the liquid crystal display device 100. At (A)–(C) are shown cathode voltages VCa–VCc applied to successively disposed cathodes 36a–36c. At (E) is shown a data voltage DS applied to a prescribed transparent electrode 105 (one of 38a–38f). Further, at (D) is shown a change of charge in a prescribed plasma channel 115, wherein τp represents a plasma life, i.e., a period from the generation to extinction of plasma.

Thus, in the present invention, the data voltages DS comprises a pulse voltage of a polarity corresponding to picture data and is applied to a transparent electrode 105 in synchronism with cathode voltages VCA–VCc. In the present invention, the application period (pulse width) of the data voltage DS in a selection period (1H) is set to be longer than the pulse width of the cathode voltages VCa–VCc and to terminate after the termination of average plasma life τp.

As a result, even if there is a difference in plasma life τp for the respective plasma channels (or chambers) 115 due to production error, it becomes possible to write in prescribed picture data at respective liquid crystal pixels corresponding to the plasma channels 115.

More specifically, as each data signal DS is set to be last for a period d after the termination of plasma life τp on an average, it becomes possible to prevent the occurrence of a plasma channel (or chamber) 115 where the data signal terminates during the plasma life τp, so that the charge storage by the data signal DS is accurately effected at all the pixels. More specifically, the length of the period d is set to satisfy 0<d≦(1H−τp) and may preferably satisfy 0.5 (1H−τp)≦d≦(1H−τp).

In other words, the data signal DS is applied to the liquid crystal at the pixels within the plasma life τp (switching-on period), the charge based on the data signal DS is accumulated at the liquid crystal layer 106 to effect the desired switching of the liquid crystal 106.

On the other hand, if the data signal DS is set to terminate simultaneously with the termination of average plasma life τp, it is possible that the data signal DS terminates before the termination of plasma life at some plasma channels 115, whereby a portion of the data signal DS lasting after the termination of plasma life τp (switching-on period) is not used to effect the charge storage in the liquid crystal layer 16 at the pixels concerned.

In this embodiment, the data voltages DS are composed of pulses of mutually opposite polarities corresponding to picture data of "white" and "black", respectively, as shown in FIG. 9. These voltage pulses may be set to have equal amplitudes both exceeding a switching threshold of the FLC 106.

As a specific example, a liquid crystal display device 100 of the above-described type having 480×640 pixels was driven under the following conditions, whereby a good picture was displayed with an excellent viewing angle characteristic at a contrast of ca. 80.

Plasma discharge voltage (VC–VA)=−350 volts.
Data voltage=±10 volts.
1H=35 μsec. (i.e., frame frequency=60 Hz)
(τp)$_{average}$=20 μsec.
(Third Embodiment)

In this embodiment, a liquid crystal display device having a structure as illustrated in FIGS. 6 and 7 similar to the one used in Second embodiment is used except for disposing instead of FLC, an anti-ferroelectric liquid crystal (AFLC) having the following properties in a cell thickness of ca. 2 μm together with a pair of polarizers disposed outside the display device so that one polarizer is set to have a polarization axis substantially in alignment with an average molecular axis in the anti-ferroelectric state.

Phase transition series:

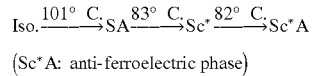

(Sc*A: anti-ferroelectric phase)

Spontaneous polarization Ps=80 nC/cm² (25° C.)
Tilt angle (H)=27 deg. (25° C.)

The liquid crystal display device may be driven in a similar manner as in the above Second embodiment except that data voltages DS are composed of zero and a positive or negative voltage corresponding to picture data of "black" or "white" with reference to the anode potential as shown in FIG. 10. The application time of DS relative to average pulse life τp is set in the same manner as in Second embodiment. The polarity of the positive or negative data voltage DS may be inverted for each frame period.

In this embodiment, a stable picture display may be performed without sticking or burning of display in addition to effects attainable in Second embodiment.

In this embodiment, it is possible to use a threshold-less AFLC for gradational display by modulating the amplitudes of data voltages shown in FIG. 10 based on given picture data carrying gradation data.

As described above, in the present invention, the data signal applied to transparent electrodes in a selection period is set to have a pulse width which is longer than that of a cathode-actuating voltage pulse and terminate after extinction of plasma in various plasma channels, whereby picture display capable of high-speed drive with excellent viewing characteristic can be performed stably.

What is claimed is:

1. A plasma-addressed liquid crystal display apparatus comprising: a liquid crystal device including a liquid crystal cell structure and a plasma cell structure in a stacked configuration; wherein the liquid crystal cell structure comprises a first transparent substrate having thereon transparent electrode stripes and an alignment film, a dielectric sheet having thereon an alignment film disposed opposite to the alignment film on the first transparent substrate, and a liquid crystal disposed between the alignment films, and the plasma cell structure comprises a second transparent substrate having thereon pluralities of cathode stripes and anode stripes disposed alternately with a prescribed spacing therebetween, and stripes of partitions formed along the anode stripes; the plasma cell structure being stacked onto the dielectric sheet of the liquid crystal cell structure via the partitions so as to form plasma chambers filled with an ionizable gas between the partitions and so that the cathode stripes and anode stripes intersect the transparent electrode stripes;

the display apparatus further comprising:
data signal application means for applying data signals to transparent electrode stripes,
anode potential application means for applying an anode potential to the anode stripes, and
cathode potential application means for applying a cathode potential capable of generating plasma in an associated plasma channel to the cathode stripes,
wherein the data signal application means applies a data signal having a pulse width which lasts for a period d after termination of average plasma life τp in the plasma channels in one horizontal scanning period 1H, satisfying a relationship of: $0.5(1H-\tau p) \leq d \leq (1H-\tau p)$.

2. A display apparatus according to claim 1, wherein the data signals comprise voltages of positive or negative polarity or zero for continuously changing light transmittance of the liquid crystal to effect a gradational display.

3. A display apparatus according to claim 1, wherein stripe-shaped spacers are further disposed within the liquid crystal layer, and the partitions and spacers have a rigidity for holding the plasma and liquid crystal cell structures against atmospheric pressure and also function as optical masking members.

4. A display apparatus according to claim 3, wherein said spacers are bonded to the first transparent substrate and the dielectric sheet.

* * * * *

UNITED STATES PATENT AND TRADEMARK OFFICE
CERTIFICATE OF CORRECTION

PATENT NO. : 6,344,840 B1
DATED : February 5, 2000
INVENTOR(S) : Osamu Taniguchi et al.

It is certified that error appears in the above-identified patent and that said Letters Patent is hereby corrected as shown below:

Column 1,
Line 41, "data a" should read -- data --.

Column 2,
Line 16, "stripes;" should read -- stripes, --;
Line 30, "stripes," should read -- stripes; --;
Line 54, "are" should read -- are, respectively, --.

Column 3,
Line 31, "phase" should read -- Phase --.

Column 4,
Line 43, "unnecessitating" should read -- removing the need for --;
Line 49, "electrodes 5" should read -- electrodes 4 --;
Line 62, "and" should read -- or --.

Column 5,
Line 3, "preferably" should read -- preferably be --;
Line 54, "driver 35" should read -- driver 34 --.

Column 6,
Line 4, "τp" should read -- and τp --.

Column 7,
Line 5, "Ⓗ at" should read --Ⓗ of--;

Line 15, "+6 volts -6 volts" should read -- +6 volts to -6 volts --;
Line 42, "characteristic" should read -- characteristics --.

Column 8,
Line 23, "channels 114" should read -- channels 115 --;
Line 30, "channel 15," should read -- channel 115, --.

UNITED STATES PATENT AND TRADEMARK OFFICE
CERTIFICATE OF CORRECTION

PATENT NO. : 6,344,840 B1
DATED : February 5, 2000
INVENTOR(S) : Osamu Taniguchi et al.

It is certified that error appears in the above-identified patent and that said Letters Patent is hereby corrected as shown below:

Column 9,
Line 9, "voltages" should read -- voltage --;
Line 12, "voltages VCA-VCc." should read -- voltages Vca.-VCc. --;
Line 33, "period)," should read -- period), and --;
Line 42, "layer 16" should read -- layer 106 --.

Column 10,
Line 16, "pulse" should read -- plasma --;
Line 51, "stripes;" should read -- stripes, --;
Line 64, "stripes," should read -- stripes; --.

Signed and Sealed this

Twenty-fourth Day of December, 2002

JAMES E. ROGAN
*Director of the United States Patent and Trademark Office*